Dec. 5, 1944.    A. NAGEL    2,364,466
FILM FEED LOCK AND SHUTTER TENSIONING
MECHANISM FOR CAMERAS
Filed Jan. 18, 1941
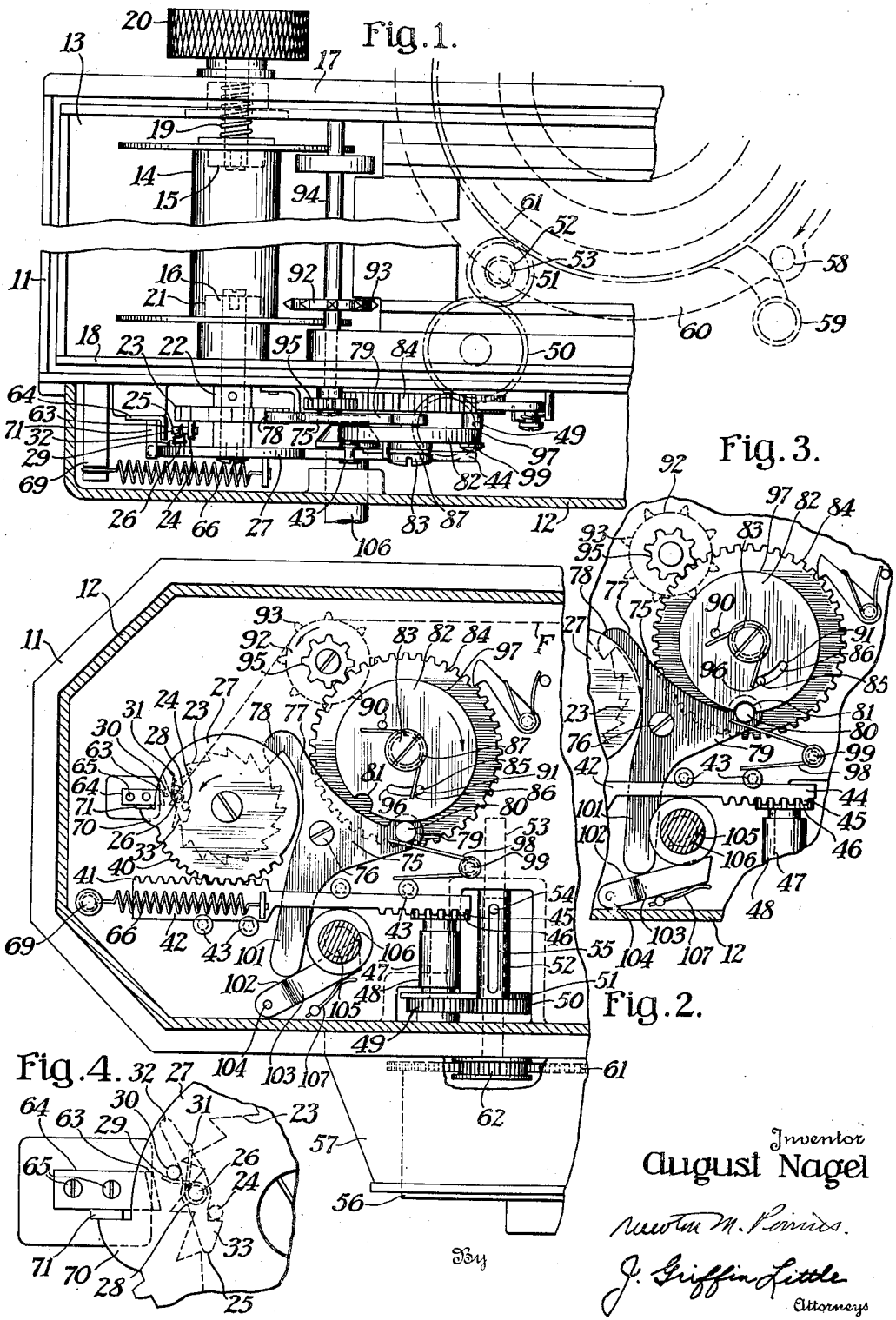
Inventor
August Nagel Patented Dec. 5, 1944

2,364,466

UNITED STATES PATENT OFFICE 2,364,466

FILM FEED LOCK AND SHUTTER TENSIONING MECHANISM FOR CAMERAS

August Nagel, Stuttgart-Degerloch, Germany; vested in the Alien Property Custodian Application January 18, 1941, Serial No. 375,036
In Germany June 7, 1939

4 Claims. (Cl. 95—31)

This invention relates to photographic cameras, and more particularly to the type in which the shutter tensioning mechanism is interconnected with the film winding mechanism so that the shutter will be tensioned during a portion of the film winding operation.

One object of the invention is the provision of an arrangement by which the shutter tensioning and the film locking mechanisms are rendered completely inoperative when the takeup film spool is removed from the camera housing.

Another object is the provision of an arrangement by which the takeup spool provides the connection or coupling between the windup knob and the shutter tensioning and the film locking mechanisms.

A further object of the invention is the provision of a shutter tensioning mechanism which is normally and completely disengaged from the film winding mechanism except for a short period during the film winding operation.

A still further object of the invention is the provision of an arrangement for disengageably connecting the shutter tensioning mechanism to the film winding mechanism to tension the shutter and then automatically to disconnect the tensioning mechanism from the winding mechanism upon completion of the tensioning operation.

Yet another object of the invention is the provision of a shutter tensioning device which is so constructed as to permit free movement of the objective mount for focusing.

A still further object of the invention is the provision of an interlock between the shutter actuating mechanism and the film winding mechanism which effectively prevents a second actuation of one of the mechanisms until the other has been first actuated.

To these and other ends, the invention resides in certain improvements and combinations of parts, all as will be hereinafter more fully described, the novel features being pointed out in the claims at the end of the specification.

In the drawing:

Fig. 1 is a rear view of a camera constructed in accordance with the present invention, with the rear cover removed and the mechanism chamber in section, showing the relation of the shutter tensioning and the film locking mechanisms;

Fig. 2 is a plan view of the mechanisms illustrated in Fig. 1, with the bottom of the mechanism housing removed, showing the relation of the parts during a portion of the film winding operation;

Fig. 3 is a plan view of a portion of the mechanism illustrated in Fig. 2, showing the position of the parts at the completion of the winding operation, and Fig. 4 is a fragmentary view of the mechanism illustrated in Fig. 2 but on a larger scale than the latter; showing the arrangement by which the shutter tensioning mechanism is disengageably connected to the film winding mechanism.

Similar reference numerals throughout the various views indicate the same parts.

The drawing shows a camera formed with a casing or housing 11 on one side of which is formed a mechanism chamber 12 which houses a film feed locking mechanism and a portion of the shutter tensioning mechanism, which mechanisms will be hereinafter more fully described. One end of the housing 11 is formed with a spool receiving chamber 13 adapted to receive a film takeup spool 14 of standard and well-known construction. The spool 14 is rotatably supported on a pair of aligned carriers 15 and 16 which are journaled in the opposite side walls 17 and 18 of the housing 11, as clearly shown in Fig. 1. The carrier 15 is slidably mounted in the wall 17 and is urged inwardly and into driving engagement with the spool 14 by a coil spring 19. When the carrier 15 is moved outwardly, against the action of the spring 19, it may be disengaged from the spool 14 to permit removal or replacement of the spool, as is well known. The outer end of the carrier 15 has connected thereto or formed integral therewith a film winding member in the form of a winding knob 20 which when rotated also rotates the carrier 15 and the take up spool 14 to wind up the exposed film onto the takeup spool in a manner which is well known to those in the art.

The spool 14 is connected in driving engagement with the carrier 16 by means of a lug 21 formed on the inner end of the carrier 16, as clearly shown in Fig. 1. As such connecting lugs are of standard and well-known construction, a further description is not deemed necessary to a full understanding of the present invention. The carrier 16 is journalled in the side wall 18 and has a portion 22 thereof which extends into the chamber 12 and on which is rigidly mounted a ratchet or film locking wheel 23. The carriers 15 and 16 as well as the spool 14 and the ratchet 23 are thus all connected together and rotate as a unit with the winding knob 20 and may, therefore, be broadly considered as a rotatable takeup spindle on which the exposed film may be wound. This ratchet 23 carries a stud 24 which is adapted to engage a pawl 25 swingably mounted on a stud 26 formed on a disk 27 loosely mounted on the portion 22 of the carrier 16, as shown in Fig. 1. The pawl 25 is under the influence of a coil spring 28 which is wrapped around the stud 26 and has one end 29 bearing against a second stud 30 on the disk 27 while the other end 31 presses against an extension or arm 32 on the pawl 25 to resiliently hold the hook end 33 of the pawl in the path of the stud 24, see Figs. 2 and 4. It is now apparent from the above description that when the ratchet 23 is rotated in the direction of the arrow Fig. 2, by similarly rotating the winding knob 20, the pin or stud 24 will move into engagement with the hook end 33 of the pawl 25 to operatively connect the ratchet 23, and hence the winding knob 20, in driving engagement with the loosely mounted disk 27.

The disk 27 is formed with a tooth segment 40 which engages a tooth rack 41 formed on a slidable member 42 which is guided by studs 43 formed on the camera housing. The opposite end 44 of the member 42 is also formed with a tooth rack 45 which meshes with a gear 46 secured to one end of a shaft 47 journaled in a sleeve 48. A gear 49 is secured to the other end of the shaft 47 and is connected through an intermediate gear 50 to a gear 51 secured to a sleeve or bushing 52 slidable on a shaft 53. The latter is provided with a pin 54 which extends into a slot 55 in the sleeve 52. The shaft 53 is used to tension the objective shutter 56 which is axially slidable or adjustable with the objective mount 57 for focusing purposes. Such adjustment can be readily made by reason of the pin and slot connection 54 and 55 which provide a spline connection between the sleeve 52 and the shaft 53. In order to tension the shutter, the carrier stud 58 for the shutter tensioning lever 59 is arranged on a ring 60, a tooth segment 61 of which meshes with the spur wheel 62 secured to the outer end of the shaft 53.

It is thus apparent from the above description and upon inspection of the drawing that when the ratchet 23 is rotated in the direction of the arrow, the loosely mounted disk 27 is similarly rotated by reason of the pin-and-pawl connection 24 and 25. Such rotation causes the tooth segment 40 of the disk 27 to engage the tooth rack 41 to slide the member 42 to the right, as viewed in Fig. 2. Such sliding causes the rack 45 to rotate the gear 46 and the shaft 47, gears 49, 50, and 51, sleeve 52, pin-and-slot connection 54 and 55, shaft 53, gear 62, and the tooth segment 61 to impart a clockwise rotation to the ring 60, as viewed in Fig. 1, to bring the stud 58 into engagement with and to actuate the tensioning lever 59 to tension the shutter. It is also apparent that the shutter tensioning mechanism has a portion thereof mounted on the camera housing 11 and a portion mounted on the objective mount 57. These parts are connected by a spline or slidable connection, the pin-and-slot connection 54 and 55, which freely permits the parts on the mount 57 to move therewith during focusing.

When the lever 59 has thus been actuated to tension the shutter, the disk 27 has been rotated a sufficient distance to bring the arm 32 of the pawl 25 into engagement with a lug or projection 63 formed on the end of a member 64 which is fixed by screws 65, or other suitable fastening means, to the side wall 18 of the camera housing, see Figs. 1, 2 and 4. Upon engagement of the arm 32 with the projection 63, the pawl 25 is turned in a clockwise direction as viewed in Fig. 4, to disengage the pawl 25 from the pin 24, thus freeing the disk 27 and hence the shutter tensioning mechanism from the ratchet 23 and the film winding mechanism. The freed shutter tensioning mechanism is now retracted or returned to its original position, as shown in Fig. 2, by means of a spring 66 one end of which is secured to the slidable member 42 while the other end is anchored to a stud 69 projecting from the wall 18, see Fig. 1. When the tensioning mechanism is thus retracted by the spring 66 a shoulder or lug 70 on the disk 27 is brought into engagement with the projection 71 extending outward from the member 64 to limit the returning or retracting movement of the tensioning mechanism, and to position the latter so that the pin or stud 24 may again engage the pawl 25 during the next film winding operation.

It is seen from the above description, that the shutter tensioning mechanism is normally and completely disconnected from the film winding mechanism. When, however, the latter is operated to wind the film onto the takeup spool 14, the shutter tensioning mechanism is connected to the film winding mechanism, by reason of the stud and pawl connection 24 and 25, so that the tensioning mechanism will be operated during a portion of the film winding operation to actuate the shutter tensioning lever 59 to tension the shutter. Upon completion of the tensioning operation, the tensioning mechanism is then automatically disconnected or disengaged from the film winding mechanism and is then returned and repositioned for the next cycle of operation, the winding of the film being continued until a new image area is moved into position at which time the film winding mechanism is locked against further operation, as will be later described. It will also be apparent from an inspection of the drawing, that the takeup spool 14 provides the sole driving connection between the two carriers 15 and 16 so that when the spool is in place, rotative movement of the winding knob 20 is imparted to the carrier 16 to actuate the shutter tensioning mechanism. However, when the spool 14 is removed, the shutter tensioning mechanism is rendered completely inoperative.

A three arm lever 75 is rotatably mounted on a stud 76 fixed to the wall 18 and has an arm 77 the free end of which is formed with a hook or pawl 78 adapted to be moved into engagement with the ratchet 23, as shown in Fig. 3, to prevent further rotation of the film winding mechanism. Another arm 79 of the lever 75 carries a stud 80 which cooperates with a notch 81 of the disk 82 which is rotatably mounted on the stud 83 affixed to the housing wall 18. A gear 84 is also rotatably mounted on the stud 83 and is connected to the disk 82 by friction and by means of a pin 85 secured to gear 84 and extending into a registering slot 86 formed in the disk 82. The pin 85 is held in proper position relative to the slot 86 by a hairpin spring 87 which is wrapped around the stud 83 and has one end in engagement with the pin 85 and the other end contacting a fixed pin 90 formed in the disk 82, see Figs. 2 and 3. The spring 87, tends to normally hold the parts in the position shown in Fig. 2 in which the pin 85 is at the right end 91 of the slot 86.

As the takeup spool 14 is rotated to wind the film, as above described, the film strip F is fed through the camera and over a measuring roll 92 the teeth 93 of which engage marginal film perforations, not shown. This film movement rotates the measuring roll 92 which is secured to a shaft 94 journaled in the opposite side walls 17 and 18. The shaft 94 extends through the wall 18 and into the mechanism chamber 12 and has rigidly secured thereto a gear 95 which meshes with the gear 84, see Fig. 2. The parts are so proportioned that the gear 84 will make one revolution when the film strip has been moved the distance of one image area. Rotation of the measuring roll 92, through the shaft 94 and gear 95, rotates the gear 84 and moves the pin 85 clockwise along the slot 86 to tension the spring 87, the disk 82 remaining stationary during this initial movement of the gear 84. When, however, the pin engages the left end 96 of the slot 86, the gear 84 and disk 82 are coupled together and rotate as a unit, the spring 87 being retained in its tensioned position. During such movement, the stud 80 is held against the periphery 97 of the disk 82 by a spring 98 which is mounted on the stud 99 and has one end engaging the stud 80 and the other end pressing against one of the studs 43. The gear 95 and disk 82 are rotated until the notch 81 of the disk is brought into registry with the stud 80, whereupon the latter, under the action of the spring 98, moves radially into the notch 81. Such movement of the stud 80 rotates the lever 75 in a counterclockwise direction, as viewed in Fig. 2 to move the pawl 78 into locking engagement with the ratchet 23 to arrest further rotation of the film winding mechanism.

This rotative movement of the lever 75 also moves a third arm 101 thereof into engagement with the upper edge 102 of a lever 103 pivoted at 104 of the side wall 18. Such engagement pivots the lever 103 in a clockwise direction and out of a notch 105 formed in the shutter trigger 106 to free the latter so that an exposure may be made. It will be remembered that the film winding mechanism is now locked. Now when the trigger 106 is depressed to make an exposure, an inclined or cone shaped portion thereon, not shown, engages the arm 101 to move the latter to the left, thus rotating the lever 75 in a clockwise direction. Such rotation disengages the pawl 78 from the ratchet 23 and thus frees the film winding mechanism, and simultaneously moves the stud 80 outwardly out of the notch 81 on the disk 82. As the latter is now free, the tensioned spring 87 serves to move the disk 82 in a clockwise direction to position the notch out of registry with the stud 80, the parts then being in the position shown in Fig. 2. When the shutter trigger 106 moves the arm 101, as above described, the latter is moved out of engagement with the pivoted lever 103 so that the latter is free to move, under the action of a spring 107, into the notch 105 of the shutter trigger 106 to lock the latter against a second actuation.

By means of this construction, the shutter trigger and the film winding mechanism are alternately locked, and neither of these mechanism can be actuated a second time until the other member has been first operated, thus effectively preventing double exposure and a wasting of an unexposed film area. It will also be observed that the turning of the winding knob 20 is ineffective to wind the film, and thus operate the measuring roll 92 and the film locking mechanism unless the film spool 14 is in position in the camera. The spool 14 thus constitutes a coupling or clutch which operatively connects the winding means or knob 20 to both the shutter tension and the film feed locking mechanisms.

The removal of the film spool from the camera obviously renders the film feed locking and the shutter tensioning mechanisms completely inoperative. While in the present embodiment, the manually controlled winding knob 20 constitutes the film winding member, it is apparent that the above described shutter tensioning mechanism and the film measuring and locking mechanism would operate in the manner described if automatic film winding means were connected to the shaft of the carrier 15. For this reason, the term winding means is to be given a broad interpretation to include both manual and mechanical film winding mechanisms.

The operation of the above-described device may be briefly summarized as follows:

When the film spool 14 is placed in position in the camera, it provides a connection or coupling between the spool carriers 15 and 16. Now when the winding knob 20 is rotated, the spool 14, carriers 15 and 16, and ratchet 23, are simultaneously rotated and the exposed film is wound up onto the takeup spool 14. This rotation of the ratchet 23 brings the pin or stud 24 into engagement with the pawl 25 to operatively connect the disk 27 in driven relation with the ratchet 23 and hence the winding knob 20. Rotation of the disk 27 slides the member 42, and through the various gear trains, rotating the ring 60 to move the stud 58 into engagement with the tensioning lever 59 to actuate the latter to tension the shutter. Upon completion of this tensioning operation, the pawl 25 is disengaged from the pin 24 and the shutter tensioning mechanism is automatically and completely disengaged from the ratchet 23 and then retracted and repositioned for the next cycle of operation.

As the film is being wound, the film strip F passes over a measuring roll 92 which is connected to and drives a gear 95 which in turn drives the disk 82 through a pin-and-slot connection 85 and 86. As the disk 82 is rotated, a notch 81 therein is brought into registry with a stud 80 on a three arm lever 75. As the stud 80 moves into the notch, under the action of the spring 98, the lever 75 is rotated to move the pawl 78 into locking engagement with the ratchet 23 to lock the film feed mechanism against further actuation. This movement of lever 75 also moves the arm 101 thereof into engagement with the lever 103 to force the latter out of locking engagement with the shutter trigger 106. When, however, the latter is operated, the lever 75 moves in reverse direction to disengage the pawl 78 from the ratchet 23 to free the film winding mechanism and to also move the lug 80 out of the notch 81. The free lever 103 now moves under the action of the spring 107 into a notch in the shutter trigger to lock the latter against a second actuation. In addition, the disk 82 is rotated in clockwise direction under the action of the spring 87 to move the notch 81 out of registry with the stud 80.

It is thus apparent from the above description that the present invention provides a camera construction in which the takeup spool provides a connection or coupling between the winding knob and the film feed and shutter tensioning mechanisms so that these mechanisms are rendered completely inoperative when the takeup spool is removed from the camera housing. It is also apparent that the shutter tensioning mechanism is normally and completely disconnected from the film winding mechanism and is connected thereto only during a portion of the winding operation to tension the shutter. After the latter has been properly tensioned, the tensioning mechanism is again completely and automatically disconnected from the filmwinding mechanism and is then retracted and repositioned for the next cycle of operation. It is also apparent that the arrangement of the shutter tensioning mechanism is such as to permit free and unobstructed movement of the objective mount for focusing.

While one embodiment of the invention has been disclosed, it is to be understood that the inventive idea may be carried out in a number of ways. This application is therefore not to be limited to the precise details disclosed, but is intended to cover all variations and modifications thereof falling within the spirit of the invention and the scope of the appended claims.

I claim:

1. In a roll film photographic camera, the combination with a camera housing, an objective mount movably supported on said housing and adjustable relative thereto for focusing, a shutter with its tensioning lever mounted on and movable with said mount, film winding means comprising a rotatable spindle carried by said housing, of lever actuating means comprising a portion positioned on said mount and a portion carried by said housing and including a member loosely mounted on and releasably connectable to said spindle, a sliding connection between said portions, means for connecting said member to said spindle so that said actuating means may be operated thereby, means for automatically disconnecting said member from said spindle when said shutter has been tensioned, and means on said housing adapted to engage said member for positioning said actuating means when disconnected from said winding means.

2. In a roll film photographic camera the combination with a camera housing an objective mount movably supported on said housing and adjustable relative thereto for focusing, a shutter with its tensioning lever mounted on and movable with said mount, film winding means comprising a rotatable spindle carried by said housing, of means movably mounted on said housing for engaging and actuating said lever to tension said shutter, means including a pawl and ratchet carried by said spindle for connecting said actuating means to said winding means so as to be operated thereby, means to automatically release said pawl and ratchet to disengage said actuating from said winding means when said lever has been moved to tension said shutter, means for retracting said actuating means upon disengagement thereof from said winding means, and stop means for positioning the disengaged actuating means.

3. In a roll film photographic camera, the combination with a camera housing, a shutter with its tensioning lever mounted on said housing, a take-up spindle rotatably mounted in said housing, means to rotate said spindle to wind up film, of a rack slidably mounted on said housing, means connected to said rack and movable into engagement with said lever to actuate the latter to tension said shutter when said rack is moved in one direction, a disk loosely mounted on said spindle and operatively connected to said rack, means for disengageably connecting said disk to said spindle to move said rack in said one direction during a portion of the film winding operation, means for automatically disengaging said disk from said spindle upon completion of the shutter tensioning operation, means for retracting said rack said disk and said first mentioned means when said disk is disconnected from said spindle, and cooperation stop means on said housing and said disk to limit the retractive movement of and to position said disk said rack and said first mentioned means.

4. In a roll film photographic camera, the combination with a camera housing, an objective mount movably supported on said housing and adjustable relative thereto for focusing, a shutter with its tensioning lever mounted on and movable with said mount, a take-up spindle rotatably mounted in said housing, means to rotate said spindle to wind up film, of a rack slidably mounted on said housing, means including a gear train operatively connecting said rack and said lever so that movement of said rack in one direction serves to actuate said lever to tension said shutter, said gear train having a portion thereof mounted on said housing and connected to said rack and another portion mounted on and movable with said mount, a splined connection between said portions to permit said mount to be moved for focusing, a disk loosely mounted on said spindle, a pawl carried by said disk, a pin on said spindle movable into engagement with said pawl to operatively connect said disk to said spindle when the latter is rotated to wind film so as to move said rack in said one direction to tension said shutter during the film winding operation, a projection on said housing arranged to engage and move said pawl out of engagement with said pin to free said disk and said rack from said spindle when said shutter has been tensioned, means for retracting said rack and disk, and cooperating stop members on said housing and said disk to limit said retraction to position said rack and disk relative to said housing.

AUGUST NAGEL.